C. H. MUMFORD.
Buttons.

No. 206,037.          Patented July 16, 1878.

WITNESSES:
Joseph A. Miller Jr
William L. Coe

INVENTOR:
Charles H. Mumford.
by Joseph A. Miller
Attorney

UNITED STATES PATENT OFFICE.

CHARLES H. MUMFORD, OF PROVIDENCE, RHODE ISLAND.

IMPROVEMENT IN BUTTONS.

Specification forming part of Letters Patent No. 206,037, dated July 16, 1878; application filed May 6, 1878.

*To all whom it may concern:*

Be it known that I, CHARLES H. MUMFORD, of the city and county of Providence, State of Rhode Island, have invented certain new and useful Improvements in Buttons; and I hereby declare that the following is a full, clear, and exact description of the same, reference being had to the accompanying drawings, forming part of this specification.

This invention has reference to improvements in collar, sleeve, stud, or other ornamental buttons, such as are made by jewelers, partly or wholly of metal, and which will be more fully hereinafter described, and set forth in the claim.

Figure 1:
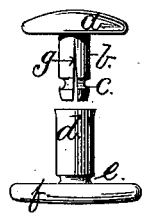
Figure 2:
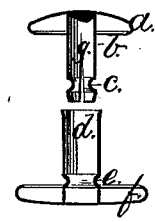

Figure 1 is a view of my improved button, the two parts being shown one above the other. Fig. 2 is a sectional view of the same.

In the drawings, a is a disk, forming one end of the ornamental button, such as are made by jewelers for shirt-studs, collar and sleeve buttons. To this disk a tubular sleeve, b, is secured, provided near its end with an annular recess, c. This tube is slit open nearly from end to end by the wedge-shaped cut g, so that the two sides form springs, which, although made of thin metal, have considerable stiffness on account of the curved form of each half of the tubular shank b.

d is a tubular shank of slightly larger diameter, so that the shank b will freely enter, and to facilitate the entrance the end of the shank d is slightly expanded. The shank d is secured to the disk f, and is contracted at e, so that when the end of the shank b is forced into the shank d, on passing the contraction at e, it will spring in until it has passed beyond e, when it will regain its normal condition, and the two disks will be held together sufficiently to withstand the ordinary wear, but will separate when extra force is applied.

The shanks b and d being made round, the button will freely turn when secured.

This button can be manufactured at less cost than buttons as heretofore made, and if the tubular shank b is made of German silver, the friction exerted in its use, acting on the springs like a burnisher, will maintain their elasticity.

Having thus described my invention, I claim as new and desire to secure by Letters Patent—

The combination of the button f, provided with a hollow shank, d, having within it a contracted neck, e, with the back a, provided with the split shank b, having on its exterior the annular recess c, all constructed substantially as and for the purpose described.

CHARLES H. MUMFORD.

Witnesses:
   JOSEPH A. MILLER,
   JOSEPH A. MILLER, Jr.